Oct. 31, 1950  J. H. McCONNELL  2,528,446
CURRENT CONTROL CIRCUIT
Filed July 7, 1947
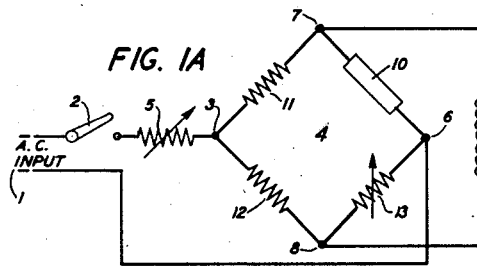
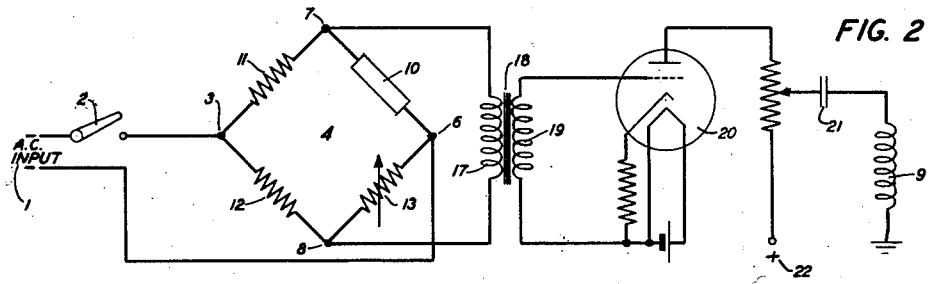
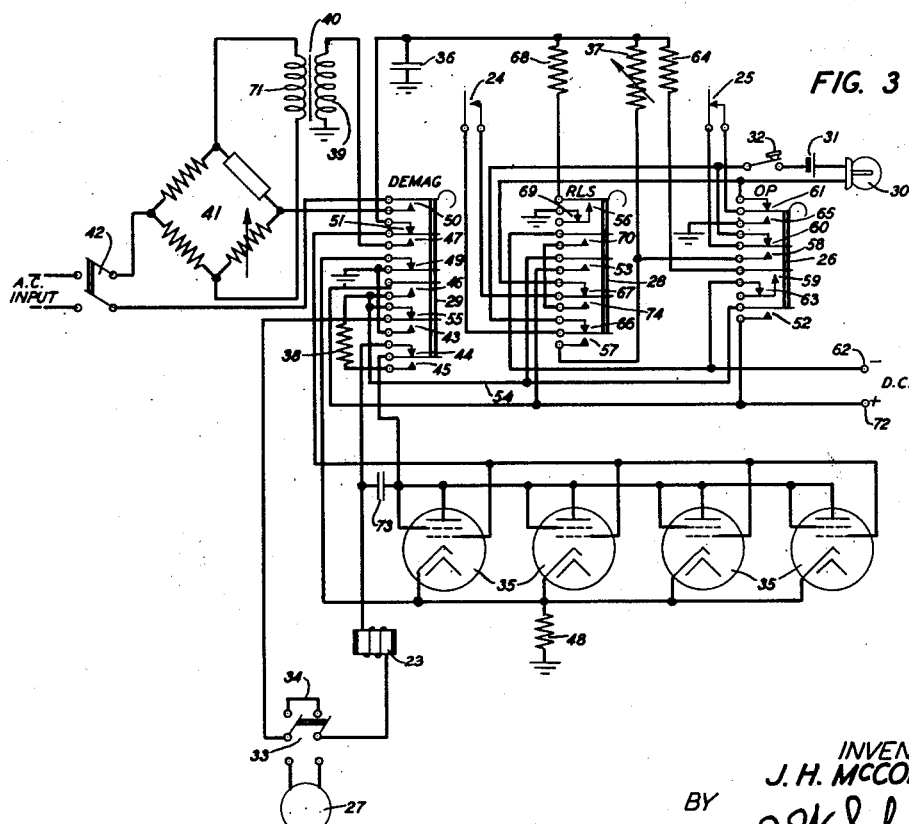
INVENTOR
J. H. McCONNELL
BY
J W Schmied
ATTORNEY Patented Oct. 31, 1950

2,528,446

UNITED STATES PATENT OFFICE 2,528,446

CURRENT CONTROL CIRCUIT

John H. McConnell, Jersey City, N. J., assignor to Bell Telephone Laboratories, Incorporated, New York, N. Y., a corporation of New York Application July 7, 1947, Serial No. 759,317

6 Claims. (Cl. 178—44)

1

This invention relates to electrical circuit controlling means and more particularly to demagnetizing circuits controlled in a novel manner.

It has been well known for some time that demagnetizing circuits may be used wherein a direct current is periodically reversed and simultaneously gradually diminished in amplitude. It is also well known to employ an alternating current of gradually diminishing amplitude for demagnetizing purposes. Each of these methods of demagnetizing has been accomplished manually and automatically. Such automatic demagnetization, utilizing direct current for instance, has been accomplished in at least one manner by the use of a circuit which produces or effects, as a demagnetizing current, a damped oscillatory charge acquiring its energy from the direct current source. One well-known manner of effecting an automatically controlled alternating current for demagnetizing purposes is to employ as the control element one of many forms of potentiometer which may be actuated by a motor or the like to produce the desired gradually diminishing amplitude of demagnetizing current.

It is the main object of the present invention to provide a simple and novel circuit arrangement whereby automatic control of an alternating current is accomplished for purposes of gradually reducing the amplitude of said current from any given value to substantially zero amplitude in a finite time.

It is another object of said invention to employ the aforesaid circuit as a demagnetizing means.

Briefly, as disclosed herein, the invention comprises the combination of an alternating current source, a demagnetizing coil and a Wheatstone bridge in circuit therebetween. The input terminals of said bridge are in circuit with the said current source and the demagnetizing coil is in circuit with the output terminals of said bridge, with, if desired, an amplifier interposed between said bridge and said coil. At least one arm of the bridge contains a thermally responsive circuit element whose resistance varies at a different rate with current through the bridge than does the resistance of the other arms of said bridge, the variation being effected by the heating property of an electric current when traversing a resistance element. The initial resistance values of all of the bridge elements are chosen so that initially the bridge will be unbalanced in a manner to effect a relatively large output voltage. Under the action of the alternating current passing through the elements of the bridge the said

2 one circuit element, whose resistance varies at a rate different from that of the other elements, will assume a value of resistance which will so balance the bridge that there is no bridge output. The net result of this action is that the bridge output is in the form of an alternating voltage, or current, of gradually diminishing amplitude which finally, after a determinable amount of time or number of cycles of alternating current, approaches substantially zero amplitude. This type of output current may readily be used for demagnetizing purposes directly, if a bridge of sufficient capacity is used, or indirectly by driving an amplifier the output current of which will be sufficiently large to perform demagnetization tasks.

Other advantages and purposes of the invention will be apparent from the subsequent disclosure of one embodiment thereof. The drawings forming a part of said disclosure are described generally as follows:

Fig. 1A illustrates a schematic representation of a demagnetizing or contral circuit according to the invention;

Fig. 1B shows the form of the output voltage or current obtained from the circuit of Fig. 1A;

Fig. 2 illustrates the use of a circuit similar to that of Fig. 1A with an amplifier interposed between the output terminals of the said circuit and the demagnetizing coil or control element; and Fig. 3 illustrates a relay testing circuit employing the control circuit of Fig. 2 as a part thereof.

Referring to Figs. 1A and 1B, a source of alternating current, not shown, such as 20 or 60 cycles or other frequency which may be determined as suitable for the application, is connectable to the "A. C. Input" 1 of the alternating current control circuit shown in Fig. 1A. One lead from this input 1 may be connected to a switch 2, the other side of which is connectable to one of the input terminals 3 of a Wheatstone bridge arrangement 4 through a variable resistance 5. The other lead from the input 1 is connectable to the other input terminal 6 of bridge 4. The output terminals 7 and 8 of said bridge 4 are connected to respective ends of a control device, such as an output coil 9 which, among other possible uses, may be used for demagnetizing purposes. The four elements 10, 11, 12 and 13 of bridge 4 can be of at least two general combinations. In general, the elements 11, 12 and 13 should comprise resistances whose temperature coefficients of resistance are substantially equal and of the same sense; i. e. positive or negative, the element 10 should comprise a resistance having either the same sense of temperature coefficient of resistance as the other elements but of a substantially different magnitude or a temperature coefficient of resistance of different sense with or without a comparable value thereof as compared to the other elements of said bridge. The former situation is readily appreciated and unnecessary of further comment. The latter situation may become existent when elements 11, 12 and 13 are, for instance, common resistance material having temperature coefficients of positive sense, if any at all, and element 10 is, for instance, a thermistor, this type of resistance being well known to possess negative temperature coefficient of resistance characteristics. The latter exemplary conditions are chosen as representing one suitable embodiment to be disclosed herein; but, it is to be understood that such ramifications as briefly indicated above are considered within the scope of the present invention, along with others not specifically mentioned but which will be suggested to those skilled in the art by the subsequent description and discussion.

The result which is obtained by use of the above briefly-discribed circuit is, of course, old; namely, effecting an alternating current 15 of gradually diminishing amplitude, as shown in Figure 1B, where 14 represents a desirable time duration found necessary when said current is used as a demagnetizing means.

The element 10 of bridge 4 will be heated by passage therethrough of alternating current from the source (not shown) when switch 2 is closed. The value chosen for resistance 5, as is well known, will determine the magnitude of alternating current applied to the input terminals 3 and 6 of bridge 4, which, of course, determines, along with other factors such as the initial unbalance of bridge 4, the initial magnitude 16 (see Fig. 1B) of the output voltage or current 15. The value of element 13 and the cold resistance of thermistor 10 are chosen to help fix the initial value 16 of the output current. The values of the bridge elements are so chosen that under the action of the bridge current flowing through thermistor 10, the resistance of said element 10 will be reduced due to the heating effect of the current therethrough. After a determinable length of time the resistance of element 10 will have been reduced to a value representing a balanced condition of said bridge 4 which, as is well known, is a condition wherein there is no output across terminals 7 and 8 of such a bridge 4. The same result would be reached if element 10 were of positive temperature coefficient of larger magnitude than that of elements 11, 12 and 13. The cold resistance of element 10 would be arranged to be lower than that required for balance whereupon a fairly large output would initially exist. After a suitable length of time after the closing of switch 2, the resistance of element 10 will have risen to balance said bridge. It is also feasible to employ elements 11, 12 and 13 having substantially no change of resistance with temperature whereupon element 10 need merely be a resistance which does have such a change.

The coil 9, to which or through which the output voltage or current 15 is applied, may be used to demagnetize any type of object requisite of such treatment, a common example being a watch. Coil 9, as will be described later, may, of course, be a winding of an electromagnetic relay or an electromagnet which it may be desired to demagnetize.

In case the output of such a circuit as shown in Fig. 1A is not of sufficient magnitude for the particular purposes desired, an amplifier may be interposed between the output terminals 7 and 8 of bridge 4 and the control coil 9, as shown in Fig. 2. The primary side 17 of a transformer 18 is connected to the output terminals 7 and 8 of bridge 4 and the secondary 19 is connected into the grid input circuit of a vacuum tube amplifier 20 arranged in a well-known fashion. The control coil 9 receives its energization from the plate circuit of tube 20 and through a condenser 21 to, of course, isolate the coil 9 from the direct current source 22. It has been discovered that a one to one ratio for transformer 18 is suitable; but there is no restriction upon the ratio desired for a particular purpose as far as practice of the invention is concerned.

The circuit of Fig. 3 discloses a relay testing circuit utilizing the invention as an important part thereof. This testing circuit permits a determination of the value of current necessary to just operate a relay and the value of current necessary to just permit release of an operated relay, it being advisable, and in some cases, necessary to demagnetize the magnetic structure of such relays prior to such operate and release current tests to eliminate, as much as possible, effects of residual magnetism possibly and probably retained by the magnetic structure.

The general content of the circuit of Fig. 3 is as follows: A relay 23 is under test and is provided with a pair 24 of make contacts and a pair 25 of break contacts. A key 26, designated "Op," is provided for controlling the testing of relay 23 to determine its operating current as indicated on meter 27. A key 28, designated "Rel," is provided for controlling the testing of relay 23 to determine its release current as indicated by said meter 27. A third key arrangement 29, designated "Demag," is provided for controlling demagnetization of the relay 23. A signal lamp 30 is provided and is energizable under control of keys 26 and 28 by means of battery 31 and switch 32. The lamp 30, when it is desired to use same by closing switch 32, will light at the beginning of a given test, be extinguished during the test and be relit at the time the particular test is completed to give a visual indication that the value of current to be determined has been so determined and may be read from meter 27. A double-pole, double-throw switch 33 enables meter 27 to be inserted into the winding circuit of relay 23 for current determination tests and enables a strap 34 to be substituted for meter 27 for the demagnetization procedure.

For the current determination tests the winding of relay 23 is in series with the plate circuits of the parallel tubes 35, the grid circuits of which are controlled by a condenser-resistance charge and discharge path comprising condenser 36, variable resistance 37, contacts 24 and 25 and various switching arrangements through the keys 26 and 28. To determine the operate current of relay 23, condenser 36 is given a large negative charge which cuts off the current output of tubes 35, this negative charge is permitted to discharge in a series circuit including the break contacts 25 of relay 23. As the condenser charge diminishes the tubes 35 will gradually begin to pass current through the winding of relay 23. At such time as the current output of tubes 35 is sufficient to operate relay 23 the break contacts 25 of relay 23 are opened to isolate condenser 36 with its then existing charge. Since meter 27 will have been in circuit with relay 23 during this test the meter 27 will now read the operate current of relay 23 sustained by a constant grid voltage on tubes 35 derived from the isolated charge on condenser 36. During this test lamp 30, if switch 32 were closed, would have been lighted before key 26 was depressed to start the test, would have gone out during the condenser discharge and would have been relit when relay 23 operated since the make contacts 24 would have been then closed to complete the circuit of lamp 30.

The test for release current is similar to the above-described action of the operate current test except that initially the condenser 36 is given a large positive charge to permit tubes 35 to pass a large current which in turn insures that relay 23 is fully operated. The positive charge is permitted to discharge when key 28 is fully depressed and, in discharging, it continuously decreases the output of tubes 35 until the release value of current is reached, whereupon relay 23 releases isolating the remaining charge on condenser 36 which in turn fixes the output current value of tubes 35 readable on meter 27.

Depression of key 29, to initiate the demagnetizing of relay 23 removes relay 23 from its series circuit with the plates of tubes 35 and connects relay 23 through isolating condenser 73 from the plates to ground, the said tube plates being connected to positive potential through plate resistance 38. Switch 33, for this circuit use, should substitute strap 34 for meter 27. Key 29 switches the grids of tubes 35 from the condenser 36-resistance 37 circuit to the secondary winding 39 of transformer 40, the primary winding 71 of which is connected to the output of bridge 41. The input of bridge 41 is connectable to a source of alternating current (not shown) by means of a switch 42.

Demagnetizing of relay 23

Switch 33 and key 29 are operated whereupon relay 23 is connected from ground over make contacts 43 of key 29, strap 34 of switch 33, through the winding of relay 23, through condenser 73 to the plates of tubes 35, the short circuit around condenser 73 being opened at break contacts 44 of key 29. The plates of tubes 35 are connected to the positive direct current potential 72 over make contacts 45 of key 29, through plate resistor 38 and over make contacts 46 of key 29. The grids of tubes 35 are connected to the secondary winding 39 of transformer 40 over make contacts 47 of key 29 and the shorting ground is removed from self-biasing cathode resistor 48 at break contacts 49 of key 29. Switch 42, having been open is now capable of completing the input circuit to bridge 41 by means of make contacts 50 of key 29 to initiate the demagnetization of relay 23 as explained previously concerning the circuit of Fig. 2. Switches 42 and 33 could have been operated prior to operation of key 29 if desired, since the bridge input is not completed until key 29 is depressed.

After the demagnetization of relay 23 it may be desired to test said relay for its operate current requirements. In this case key 29 is released and switch 42 is opened. Switch 33 is operated to its lower position to put meter 27 in circuit with relay 23. In the normal position of key 29 the condenser 73 is short-circuited by the break contacts 44 of key 29, the plate resistor 38 is removed from the plate circuit of tubes 35 at make contacts 45 of key 29 and the grid circuit of tubes 35 is connected to condenser 36 by means of break contacts 51 of key 29. Plate voltage 72 is connectable to tubes 35 by means of make contacts 52 of key 26 or make contacts 53 of key 28, over lead 54, break contacts 55 of key 29, through meter 27, the winding of relay 23 and break contacts 44 of key 29 to the plate circuit of tubes 35. Condenser 36 is isolated at the make-before-break contacts 56 of key 28, make contacts 57 of key 28, make contacts 58 of key 26 and make-before-break contacts 59 of key 26.

Test for operate current of relay 23

Switch 32 is closed whereupon lamp 30 lights over a circuit from battery 31 through switch 32, over break contacts 60 of key 26, break contacts 25 of released relay 23, break contacts 61 of key 26, lamp 30 to battery 31. When key 26 is depressed the circuit of lamp 30 is opened at the break contacts 60 and 61 of key 29, whereupon lamp 30 is extinguished; plate voltage 72 is supplied to the plates of tubes 35 over make contacts 52 of key 26; a large negative voltage 62 is connected to condenser 36 over break contacts 63 and make-before-break contacts 59 of key 26 through a small protective resistance 64. This negatively charges condenser 36 almost instantly whereupon the grids of tubes 35 are driven far below cut-off and the tubes 35 do not furnish current to relay 23. Complete depression of key 26 opens the negative charging circuit of condenser 36 at break contacts 63 of key 26 and connects a discharge path for said condenser 36 to ground through a high variable resistance 37 and over make contacts 58 of key 26, break contacts 25 of relay 23 and to ground over make contacts 65 of key 26. The negative voltage on condenser 36 will gradually leak to ground over the latter path until the condenser voltage, which is grid voltage for tubes 35, reaches a less negative value sufficient to permit tubes 35 to supply operating current to relay 23. At such time relay 23 will operate. Operation of relay 23 opens the condenser discharge path at the break contacts 25 of relay 23, stopping the discharge and isolating the grid circuits of tubes 35, whereupon meter 27 will indicate the sustained current which was the value required for relay 23 to just operate. Operation of relay 23 also closed its make contacts 24 to complete the lamp circuit traceable as follows: from battery 31, through switch 32, over break contacts 66 of key 28, make contacts 24 of relay 23, break contacts 67 of key 28, lamp 30, back to battery 31. This will comprise a visual indication of completion of the test and key 26 may be released to normal. In releasing to normal, key 26 by means of its contact combinations 59 and 63 may again charge condenser 36 negatively to thereby release relay 23. If it is desired to prevent this, contacts 63 may be retained open until contacts 59 have opened. A subsequent test for release current of relay 23 is not dependent upon one or the other of these circumstances. It may be desirable to release relay 23 for another demagnetizing process prior to release current determination or it may be desired to perform the release current test immediately after the operate current test without having released relay 23. Lamp 30 will be lighted at the beginning of the release current test at any rate since either break contacts 25 or make contacts 24 of relay 23 will be closed to complete the lamp circuit.

Test for release current of relay 23

Depression of key 28 applies plate voltage 72 to tubes 35 over make contacts 53 of key 28 and completely discharges condenser 36 to ground through small protective resistance 68 and over make-before-break contacts 56 of key 28 and break contacts 69 of key 28. With condenser 36 at ground potential, as are the cathodes of tubes 35, tubes 35 will pass a large amount of current to fully operate relay 23. Operation of relay 23 closes make contacts 24 of relay 23 and opens break contacts 25 of relay 23. The lamp 30 circuit is opened at break contacts 66 and 67 of key 28, whereupon lamp 30 is extinguished. Full depression of key 28 opens the discharge circuit to ground of condenser 36 at break contacts 69 of key 28 and applies to condenser 36 a high negative potential 62 over make contacts 70 of key 28, make contacts 71 of key 28, make contacts 24 of relay 23, make contacts 57 of key 28 and high resistance 37. Condenser 36 will gradually charge negatively over the latter circuit and the output current of tubes 35 will accordingly decrease. When this current has decreased to a value at which relay 23 will release, the relay 23 releases and in doing so opens its make contacts 24 and thus isolates the condenser 36 so that condenser 36 cannot lose its remaining charge. This residual charge, operating as grid voltage for tubes 35, will sustain a plate current through relay 23 and meter 27 which is indicated by meter 27 as the just release value of current for relay 23. Release of relay 23 permits its break contacts 25 to close, thus again completing the circuit for lamp 30 which lights to indicate completion of the test. As before, the release of key 28 at this time may, by reason of its contact combination 56 and 69, discharge condenser 36 to reoperate relay 23, but as will be appreciated this can be prevented, if desired, by merely delaying closure of break contact 69 of key 28 until make contacts 56 of key 28 have opened.

The keys 26, 28 and 29, as well as switches 32, 33 and 42 may by known means be operable through the media of relays instead of being manually operated and the invention as shown employed in the manually operable test circuit of Fig. 3 is equally operable in other circuit applications which will be suggested by this disclosure.

It is not intended that the scope of the present invention be limited to specific embodiments or uses shown or described herein and therefore claims are appended which alone define the scope of said invention.

What is claimed is:

1. An unbalanced Wheatstone bridge, a source of alternating current of substantially constant amplitude, means operative to connect said source across one diagonal of said bridge, at least one arm of said bridge comprising a thermally responsive impedance circuit element, said element responsive to said source upon the operation of said means to alter its impedance to bring said bridge gradually to balance, whereby said constant amplitude current is automatically converted to an alternating-current voltage across the other diagonal of said bridge of an amplitude which diminishes gradually from a finite value to zero.

2. An unbalanced Wheatstone bridge, a source of alternating current of substantially constant amplitude, means operative to connect said source across one diagonal of said bridge, at least one arm of said bridge comprising a thermally responsive impedance circuit element, said element responsive to the heating effect of the passage therethrough of current from said source upon the operation of said means to alter its impedance to bring said bridge gradually to balance, whereby said constant amplitude current is automatically converted to an alternating-current voltage across the other diagonal of said bridge of an amplitude which diminishes gradually from a finite value to zero.

3. An unbalanced resistance Wheatstone bridge, a source of alternating current of substantially constant amplitude, means operative to connect said source across one diagonal of said bridge, at least one arm of said bridge comprising a resistance having a temperature coefficient of resistance materially different from those of other arms of said bridge, said resistance responsive to the heating effect of the passage therethrough of current from said source upon the operation of said means to alter its resistance to bring said bridge gradually to balance, whereby said constant amplitude current is automatically converted to an alternating-current voltage across the other diagonal of said bridge of an amplitude which diminishes gradually from a finite value to zero.

4. An unbalanced resistance Wheatstone bridge, a source of alternating current of substantially constant amplitude, means operative to connect said source across one diagonal of said bridge, three arms of said bridge comprising resistances having substantially equal temperature coefficients of resistance, the fourth arm of said bridge comprising a resistance having a temperature coefficient of resistance materially different from those of other arms of said bridge, the cold resistances of said arms arranged to effect an unbalance of said bridge, said fourth arm resistance responsive to the heating effect of the passage therethrough of current from said source upon the operation of said means to alter its resistance to bring said bridge gradually to balance, whereby said constant amplitude current is automatically converted to an alternating-current voltage across the other diagonal of said bridge of an amplitude which diminishes gradually from a finite value to zero.

5. An unbalanced resistance Wheatstone bridge, a source of alternating current of substantially constant amplitude, means operative to connect said source across one diagonal of said bridge, three arms of said bridge comprising resistances having substantially equal positive temperature coefficients of resistance, the fourth arm of said bridge comprising a resistance having a positive temperature coefficient of resistance materially different from those of other arms of said bridge, the cold resistances of said arms arranged to effect an unbalance of said bridge, said resistance in said fourth arm when cold being lower than required to balance said bridge, said fourth arm resistance responsive to the heating effect of the passage therethrough of current from said source upon the operation of said means to increase its resistance to bring said bridge gradually to balance, whereby said constant amplitude current is automatically converted to an alternating-current voltage across the other diagonal of said bridge of an amplitude which diminishes gradually from a finite value to zero.

6. An unbalanced resistance Wheatstone bridge, a source of alternating current of substantially constant amplitude, means operative to connect said source across one diagonal of said bridge, three arms of said bridge comprising resistances having substantially equal positive temperature coefficients of resistance, the fourth arm of said bridge comprising a resistance having a negative temperature coefficient of resistance, the cold resistances of said arms arranged to effect an unbalance of said bridge, said resistance in said fourth arm when cold being higher than required to balance said bridge, said fourth arm resistance responsive to the heating effect of the passage therethrough of current from said source upon the operation of said means to decrease its resistance to bring said bridge gradually to balance, whereby said constant amplitude current is automatically converted to an alternating-current voltage across the other diagonal of said bridge of an amplitude which diminishes gradually from a finite value to zero.

JOHN H. McCONNELL.

REFERENCES CITED

The following references are of record in the file of this patent:

UNITED STATES PATENTS

| Number | Name | Date |
| --- | --- | --- |
| 2,025,775 | Rieber | Dec. 31, 1935 |
| 2,118,174 | Doane | May 24, 1938 |
| 2,240,749 | Beechlyn | May 6, 1941 |
| 2,244,058 | Crofford | June 3, 1941 |
| 2,347,369 | Roters | Apr. 25, 1944 |
| 2,414,899 | Rust | Jan. 28, 1947 |
| 2,445,459 | Snyder | July 20, 1948 |

FOREIGN PATENTS

| Number | Country | Date |
| --- | --- | --- |
| 461,203 | Great Britain | Feb. 21, 1937 |